United States Patent [19]
Alonso

[11] Patent Number: 5,953,789
[45] Date of Patent: *Sep. 21, 1999

[54] CHECKING MECHANISM FOR RECIPROCATIVE DEVICES

[76] Inventor: Ricardo Alonso, 111 S. Perry St., Denver, Colo. 80219

[*] Notice: This patent is subject to a terminal disclaimer.

[21] Appl. No.: 09/005,442

[22] Filed: Jan. 10, 1998

Related U.S. Application Data

[63] Continuation-in-part of application No. 08/677,101, Jul. 9, 1996, abandoned.

[51] Int. Cl.⁶ .................................................. E05F 5/02
[52] U.S. Cl. .......................................... 16/82; 16/66; 16/49
[58] Field of Search .................................... 16/82, 66, 49, 16/71, 72, 84, 85, DIG. 10, DIG. 17

[56] References Cited

U.S. PATENT DOCUMENTS

| | | | |
|---|---|---|---|
| 2,732,920 | 1/1956 | Newton | 16/66 |
| 3,032,806 | 5/1962 | Mallory | 16/66 |
| 3,162,889 | 12/1964 | Runnels | 16/82 |
| 3,566,435 | 3/1971 | Nakamura | 16/66 |
| 3,665,549 | 5/1972 | Quinn | 16/66 |
| 4,723,765 | 2/1988 | Pearson | 16/66 |
| 4,777,698 | 10/1988 | Lord | 16/66 |
| 4,815,163 | 3/1989 | Simmons | 16/82 |

FOREIGN PATENT DOCUMENTS

| | | | |
|---|---|---|---|
| 623038 | 7/1961 | Canada | 16/66 |

*Primary Examiner*—Chuck Y. Mah

[57] ABSTRACT

A checking mechanism (22) to frictionally check reciprocative devices (10) comprising a rod (16) that functions within a body (12) controlling a biasing means (11); the mechanism (22) providing superior leverage and torsion causing substantial direct frictional pressure (29) upon the rod (16), mountable axially (17) through an aperture configuration (26) bounded by a central structure (34) comprising a fulcrum locus (26-A) opposing a counter locus (26-B), both composed upon a common axis of symmetry (32) and each providing at least one opposing friction point (28) to create the direct frictional pressure (29) within an axial plane (30), torsionally urged upon the surfaces (16-A) (16-B) of the rod (16) wherein the distance between the opposing points (28) is less than the diameter of the rod (16), thus the pressure (29) created between the points (28) is not linearly aligned upon the common axis of symmetry (32); the mechanism (22) leveraged by a trigger appendage (38) fixated to the central structure (34) forming a fixated joint (42); the trigger appendage (38) providing a trigger point (40) for abutment against said body (12), the trigger point (40) variably disposed upon a substantial curvature surface to include an arching, ovoid, and convex design (40-A).

25 Claims, 4 Drawing Sheets

Fig. 10

List Of Reference Numerals

| | | | |
|---|---|---|---|
| 10 | reciprocative device | 30 | axial plane of 29 |
| 11 | biasing means of 10 | 31 | center axis of 26 |
| | 11-A outward biasing force | 32 | common axis of symmetry of 26 |
| | 11-B inward biasing force | | |
| 12 | piston body of 10 | 34 | central structure of 26 |
| 14 | end cap of 12 | 36 | notches of 26 |
| 16 | piston rod of 10 | 37 | sheet metal gauge of 22 |
| | 16-A curved surfaces | | 37-B offsetting planes |
| | 16-B non-curved surfaces | 38 | trigger appendage of 22 |
| 17 | axis of 16 | 40 | trigger point of 38 |
| 18 | support hub of 16 | | 40-A arching, ovoid, or convex designed surface |
| 20 | protruding lugs of 16 | | 40-B pad or clip |
| 22 | checking mechanism | | 40-C adjustable screw |
| 24 | pivotal engagement of 22 | 42 | fixated joint of 34 and 38 |
| | 24-A idle position | | 42-A face axis of 42 |
| | 24-B checking position | | 42-B origin axis for 42 |
| | | | 42-C trigger plane of 40 |
| 26 | aperture configuration of 22 | 43 | strengthening means of 42 |
| | 26-A fulcrum locus | | |
| | 26-B counter locus | 44 | adjustment means of 28 |
| 28 | opposing friction point of 26 | 46 | functional gap between 12 and 34 |
| 29 | direct frictional pressure of 28 | | |

CHECKING MECHANISM FOR RECIPROCATIVE DEVICES

This is a continuation-in-part of Ser. No. 08/677,101, filed on Jul. 9, 1996 (09-07-96), now abandoned.

FIELD OF INVENTION

This invention relates to various reciprocative devices comprising a rod which functions from within a body. The device is utilized for controlling the movement of an object attached onto the device. A reciprocating door closer system installed on a common door exemplifies such a device, by providing a biasing means for varying and controlling the movement of the door. More particularly, this invention comprises an improved apparatus and methodology to frictionally check the reciprocative function of the device, through increased leverage and torsion causing the friction.

BACKGROUND OF THE INVENTION

A portion of the disclosure of this patent document contains material which is subject to copyright protection. The copyright owner has no obligation to the facsimile reproduction by anyone of the patent document or the patent disclosure, as it appears in the Patent And Trademark Office patent file or records, but otherwise reserves all copyright whatsoever.

A brief description of a reciprocative device includes a basic door closer system which is controlled with liquid or gas. The device generally contains a piston assembly including a piston and sealing o-ring; piston rod varieties which include diametrically curved and non-curved surfaces; internal compression spring and hydraulic biasing operators; cylindrical piston body; sealed and non-sealed end caps; fluid restriction valves; attachment members; and the checking mechanism to which this invention pertains. Such door closer systems which comprise checking mechanisms are described in U.S. Pat. Nos. 2,732,920; 2,920,338; 3,032,806; 3,162,889; 3,566,435; 3,665,549; 4,777,698; and Canadian Pat. No. 623,038.

The checking mechanism is utilized to independently hold the door and door closer in an open or extended position for an indefinite period of time. The simplistic mechanism is axially mounted upon the extended rod of the device, for leveraging certain biasing forces controlled by the device into torsion. The torsion is urged between opposing points within an axial plane of the mechanism. The torsion causes substantial direct frictional pressure onto the surfaces of the piston rod. Thus. the mechanism frictionally checks the reciprocative function of the device with direct pressure causing the friction. Among the more elaborate checking mechanisms developed are illustrated in U.S. Pat. No. 4,194,264 to Soffregen (1980), and U.S. Pat. No. 4,815,163 to Simmons (1989). Through variously attached apparati comprising these mechanisms, an elaborate method is created to check the rod of the device similarly to the basic mechanism disclosed herein.

The prior art checking mechanism is usually metal stamped from a sheet material such as a predetermined sheet metal gauge. The mechanism comprises three main components: a) an aperture configuration bounded within a central structure; b) a trigger appendage; and c) a fixated joint connecting component a onto component b. The aperture configuration permits the mechanism to mount upon the rod of the device. The aperture configuration comprises opposing loci which define the opposing friction points. These points create the torsional pressure causing the friction within the axial plane. The central structure provides a boundary for the aperture configuration. The trigger appendage acts as a lever and provides a trigger point for abutment to the piston body. The central structure and the trigger appendage are typically flattened planes composed from the sheet metal gauge. The fixated joint angularly attaches the central structure onto the trigger appendage. The components differ slightly on the various prior art mechanisms, relative to the independent manufacturer's own design. However, the functionality of the three components are similar on most the prior art mechanisms.

The hold-open feature is manually activated by first opening the door to a desired position, thus extending the piston rod of the fixated door closer system from within the piston body. A counter-force is then normally created as a result of the system's biasing operators. The checking mechanism is axially mounted onto the rod through the aperture configuration, first by moving the mechanism to a desired position on the extended rod. Releasing the door, the biasing operators act to return the rod towards the normally retracted position within the body. The biasing force causes the mechanism to lever at the trigger appendage, once the body contacts the mechanism upon the trigger point.

The biasing force is redirected at the fixated joint which causes the checking mechanism to torsionally pivot on the center axis of the aperture configuration, and pivot on the axis of the piston rod. Thus, the mechanism pivotally engages onto the rod surface, urged upon the metallic edges of the opposing loci comprising the opposing friction points. The energy is substantially equalized and distributed to the points which interact and deliver the friction within the axial plane of the mechanism. The direct frictional pressure created by the points is applied onto the curved and non-curved surfaces of the piston rod, whereby the mechanism frictionally checks the device. More biasing force controlled by the device results in more torsional pressure causing the friction onto the surfaces of the rod. Sectionally dividing the mechanism through the common axis of symmetry and connecting the opposing points within the axial plane, connected to the trigger point, a simple angle is illustrated. Therefore, the reader can better understand the principles of pressure distribution, and the distance from the trigger point to the opposing loci comprising the opposing friction points.

Component a) the aperture configuration bounded by the central structure, comprises the opposing loci and points for urging the direct frictional pressure onto the surfaces of the rod. The loci are defined as the fulcrum locus and the counter locus, separated by the center axis. Both loci are composed upon the common axis of symmetry. In the prior art, each locus comprises a single opposing friction point which torsionally delivers the substantial direct frictional pressure onto the surfaces of the rod. In prior art, the opposing friction points are composed upon the common axis of symmetry. Thus, the direct frictional pressure is also substantially aligned upon the common axis of symmetry. The friction points are described as any area which substantially provides contact upon the surfaces of the rod. The uniqueness of the aperture is often specifically limited to the rod applied thereto, and will not permit the mechanism to interchange with other devices comprising various other types of rod diameters.

As a result of the two opposing friction points being located upon the common axis of symmetry, the distance between the opposing points is dictated by the diameter of rod along the common axis of symmetry. In prior art designs, placement of two opposing friction points at any other location other than upon the common axis of symmetry would be impossible and would render the simplistic mechanism inoperable. Therefore, the distance between the points is limited to not any lesser a distance than the diameter of the rod, and can not be modified. The geometry of prior art aperture configurations define the most major limitations for the art.

First, because the distance between the loci is defined by the greatest diametric sectional distance of the piston rod along the common axis of symmetry, the two opposing points are extremely located apart from each other and therefore minimally centralized upon the common axis of symmetry. Only a modification of the piston rod could effect a prior art checking mechanism to possibly check away from the common axis of symmetry. Canadian Pat. 623,038 to Mallory (1960) shows various mechanisms designed for usage upon modified piston rods comprising curved and non-curved surfaces. However, as described in the patent this notion was created solely to prevent any rotation of checking mechanism upon the piston rod surface, rather than provide any uniqueness for the two opposing friction points (number 22). The points again remain aligned upon the common axis of symmetry, and provide no lesser a distance between the points than the diameter of the rod.

Secondly, the two opposing friction points interact to provide only a singular source of substantial direct frictional pressure, linearly aligned upon the common axis of symmetry. Thus, there is no substantial lateral direct frictional pressure provided by the points away from the common axis of symmetry. If lateral pressure were available, such pressure could provide stabilization and securement onto the surfaces of the rod. For balance, the two points applying the direct frictional pressure must always remain linearly aligned and dependent upon the common axis of symmetry. It shall be noted that various prior art checking mechanisms including those equipped with a more narrow trigger appendage, may demonstrate a slight lateral rotation due to the lack of balance for the two opposing points. However, because the rotation of the checking mechanism is not maximized, a close examination of such mechanisms reveals that no substantial lateral direct pressure occurs.

Some checking mechanisms have an aperture configuration which is circular shaped, slightly larger than the diameter of the piston rod. When the circle is tilted as the mechanism engages the rod, the circular configuration conforms to an elliptical shape. The results again provide that only two substantial opposing friction points within the axial plane, check the surfaces of the rod. U.S. Pat. No. 2,920,338 to Falk (1960) (FIG. 3) also shows a circular configuration. The two loci comprise minimal points, however as the two loci wear out they tend to flatten and create slightly larger friction points as will be further discussed below.

Certain less comnmon types of door closer systems comprise piston rods having non-curved surfaces. The checking mechanisms for these devices comprise loci with substantially larger contacting areas. However, these designs are limited to the non-curved surfaces of the squared piston rod varieties. Thus, the two opposing friction points are dictated by the diametric sectional distance of the piston rod upon the common axis of symmetry. U.S. Pat. No. 3,032,806 to Mallory (1962), (FIG. 5) specifically shows checking mechanisms comprising such designs with substantially larger loci (number 26).

A separately related yet disadvantageous factor apart from the inferior checking mechanism design, is that modern piston rods providing curved and non-curved surfaces are often very smooth. The surfaces actually becomes polished and smoother with frequent usage. This smooth surface lacks any contributing traction for the two opposing friction points. A slight film of oil may also contribute to the lack of traction. During testing conducted involving prior art, worn door closer systems comprising smoothly polished rods were retrofit with brand new checking mechanisms. Results indicated that slippage soon occurred on the smooth rods, even when mounted with the brand new mechanisms.

Component b) the trigger appendage acts as a lever to leverage the mechanism for pivotal engagement upon the device. The trigger appendage transposes the biasing forces controlled by the device into the direct frictional pressure upon the rod. The trigger appendage provides a trigger point for abutment onto the piston body. The trigger point varies upon the surface of the trigger appendage. The trigger point is defined upon a trigger plane. The trigger plane generally projects from the origin axis for the fixated joint, projected to the trigger point abutting the body of the device. Because the surface of the trigger appendage is substantially flat and also projects from the origin axis, the trigger plane therefore remains fixated as the trigger point varies upon the surface of the trigger appendage. Thus, in prior art the trigger point is best defined upon a non-variable trigger plane. The flat surface of the trigger appendage offers no other adjustable features for the varying trigger point.

Prior art checking mechanism provide a substantially similar distance between the three functional points of leverage. Specifically, the distance from the trigger point to the fulcrum locus is not much greater than the distance between the opposing friction points within the loci. An average door closer system comprising a 1.25" (32 mm) piston body and 0.313" (8 mm) piston rod, comprises a 1.5-to-1 average leverage ratio for the mechanism. Again, unless the piston rod is modified the distance between the two opposing points can not be modified. Resultantly, the sectional distance between the two opposing points may never become altered or decreased to partake in any possible leverage advantage for the trigger point.

It may seem obvious that to obtain an increase in leverage ratio, the length of the trigger appendage should therefore be increased. However, merely increasing the length of the fixated trigger appendage would require decreasing the fixated joint, because of the flattened nature comprising the trigger appendage. The flattened surface of the trigger appendage limits the trigger point to the non-variable trigger plane, and will not compensate for an increase in the surface area resulting from any lengthening of the trigger appendage. Lengthening the trigger appendage would also place more stress onto the joint, further weakening the mechanism which often does not comprise hardness or temper modification for the soft sheet steel gauge.

The trigger appendage must create a functional gap between the central structure and the piston body. The gap must prevent any simultaneous touching of the central structure against the body, which disrupts the direct frictional pressure created by the opposing points upon the rod. The flattened trigger appendage also offers less surface area to increase the functional gap. As the checking mechanism wears and fatigues, the trigger point changes and climbs the surface of the flattened trigger appendage. Due to the non-variable trigger plane, the functional gap is reduced at the same rate as the climbing trigger point. Thus, there is less surface for the trigger appendage to provide certain variable extension and adjustment for a wearing checking mechanism. The flattened trigger appendage also offers less universalness to adapt a single checking mechanism to various devices.

Component c) the fixated joint comprises an angular connection between the central structure and the trigger appendage. The joint angularly directs the biasing forces controlled by the door closer biasing operators, to the opposing points torquing within the axial plane which cause the direct frictional pressure. All prior art checking mechanisms disclosed demonstrate a fixated joint which is greater than 90 degrees at the origin for both components. Some modern checking mechanisms comprise angular fixated joints as great as 120 degrees at the origin. The angle at the origin is determined by projecting an axis (face axis) upon the face of the central structure, and projecting the other axis (origin axis) from the origin for the trigger appendage. The origin may be determined as the best angle created between both components.

Among other factors, the angle must limit the central structure from simultaneously touching against the piston body along with the trigger point. Any simultaneous touching of the central structure disrupts the torsional engagement between the opposing friction points urged upon the rod. Therefore, the degree of the angle for the fixated joint must contribute to the functional gap between the central structure and the piston body. Because the prior art mechanisms are primarily manufactured from common sheet steel which is relatively soft, the joint is therefore subject to fatiguing which reduces the functional gap. In order to provide a mechanism which does not slip, the joint should be both fixated and capable of withstanding sufficient pressure. U.S. Pat. No. 3,566,435 to Nakamura (1971) shows a perpendicular angular joint which is not fixated. Resultantly, this mechanism provides an intentional slipping feature as described within the contents of the patent.

Another known problem contributing to a substantial reduction in the functional gap is defined by the natural wearing of the metallic edges which comprise the opposing friction points. The wearing causes the points to flatten which may result in a loss of substantial direct frictional pressure. Thus, the pressure becomes distributed over the two flattened points instead of being forcefully urged, as upon sharper biting edges comprising the loci of a brand new checking mechanism. A decrease in the functional gap may also be caused by the lateral rotation of the mechanism as previously described. Conclusively, any substantial reduction in the functional gap may ultimately render the mechanism useless.

SUMMARY OF THE INVENTION

Re-configuration of the prior art checking mechanism transposes a substantially higher direct frictional pressure, torsionally urged upon the opposing friction points within the axial plane. Similar to the prior art checking mechanism which utilizes the two opposing friction point concept, the superior design may function comprising substantially larger contacting loci. However, the superior design would comprise more than two points which oppose and create substantial plural sources of direct frictional pressure within the axial plane, the pressure being separate and/or away from the absolute or substantial linear alignment upon the common axis of symmetry. The opposing friction points would apply a more secure and stable pressure which checks the surfaces of the rod with substantial lateral stability. Thus, less biasing force is required from the reciprocative device to activate the checking function for the mechanism.

Furthermore, by decreasing the fixated joint to comprise an angle which is substantially perpendicular or less, in combination with an improved trigger appendage design, a substantial increase in leverage is created. The superior trigger appendage would comprise a substantial and continual curvature surface, thus disposing a trigger point upon a variable trigger plane and projecting a disposable surface from the origin axis for the fixated joint. Resultantly, the leverage is increased; the torsion created within the axial plane is increased; the direct frictional pressure is increased; the functional gap is increased; and a superior, universal checking mechanism is created to extend the life of the complete door closer system.

This invention comprises an improved checking mechanism, utilized for frictionally checking a reciprocative device including door closer systems. The objects and advantages of the invention include substantial improvements to the three major components of the simple checking mechanism: a) the aperture configuration bounded within a central structure; b) the trigger appendage; and c) the fixated joint connecting component a onto component b.

Superior component a) the aperture configuration comprises a simple re-configuration, resulting in substantial improvement in functionality and reliability for the checking mechanism. The opposing friction points have been repositioned to provide torsion which causes direct frictional pressure that is not in substantial or absolute linear alignment upon the common axis of symmetry. An object of this invention is to provide more than two substantial points. Another object of this invention is to provide a sectional distance between the opposing friction points which is substantially less than the diametric cross-sectional distance of the rod engaged thereto. Another, object of this invention is to reduce the cross-sectional distance between the opposing friction points. Another object of this invention is to provide more than two substantial opposing points, providing at least three substantial points. Another object of this invention is to provide a second source of the direct frictional pressure within the axial plane of the mechanism. Another object of this invention is to provide points which stabilizes the surface of the rod with substantial lateral pressure. Another object of this invention is to increase the direct frictional pressure within the axial plane, urged onto the surfaces of the rod. Another object of this invention is to increase leverage for the trigger point. Another object of this invention is to provide direct frictional pressure within the axial plane over a greater surface area of the rod. Another object of this invention is to require less biasing force controlled by the device to activate the mechanism. Another object of this invention is to accommodate various piston rods comprising both curved and non-curved surfaces. Another object of this invention is to utilize the naturalized surface areas available when modifying the aperture to accommodate rods with a support hub. Another object of this invention is to eliminate the certain lateral rotation of mechanisms with narrow trigger appendages as described above.

The metallic point surfaces may be further plated, hardened, tipped, coated, and separately inserted into the central structure. An object of this improvement is to provide durability for the opposing friction points, substantially eliminating any flattening of the points. Another object of this improvement is to deliver maximum friction upon piston rods comprising curved and non-curved surfaces.

The sides of the aperture configuration may comprise notches. An object of this invention is to accommodate rods with protruding lugs and supporting hubs comprising diametric measurements larger than the diameter of the rod engaged thereto.

The superior central structure which bounds the aperture configuration, provides various improvements including offsetting planes greater than the single plane of the sheet material gauge whereby the loci are comprised. The offset intentionally separates the opposing points axially along the center axis. An object of this invention is to accommodate the superior aperture configuration bounded by the central structure. Another object of this invention is to provide compensation for the greater range of pivotal engagement required by the mechanism to frictionally check the piston rod surface away from substantial linear alignment upon common axis of symmetry. Another object of this invention is to provide opposing friction points closer to the center axis. Another object of this invention is to maintain a substantial vertical posture for the checking mechanism. Another object of this invention is to possibly accommodate a similar, two point concept which comprises substantially larger contacting loci providing direct frictional pressure within the axial plane, away from the substantial or absolute linear alignment upon the common axis of symmetry. Another object of this invention is to reduce the sectional distance between the opposing friction points. Another object of this invention is to increase the distance from the trigger point to the lower-rear fulcrum point. Another object of this invention is to provide a stronger central structure design. Another object of this invention is to provide compensation for an improved trigger appendage design.

The central structure may include a second structure, separate although attached to the first structure. Another object of this invention is to provide an adjustment for the checking mechanism. Another object of this invention is to vary the distance between the opposing points within the axial plane. Another object of this invention is to accommodate various piston rod and piston body sizes. Another object of this invention is to modify the mechanism for various other types of reciprocative devices such as automotive lift support systems. Another object of this invention is adapt the mechanism upon a rod without requiring the rod or the device to be removed from the supporting hub.

The central structure may be made from a thicker material with separate pieces inserted to serve as loci. An object of this improvement is to provide a utilization of all modern synthetic materials. Another object of this improvement is to provide compensation for the offsetting design. Another object of this invention is to accommodate reciprocative devices with a fixated support hub, such as with certain automotive lift supports. An object of this invention is to provide the means for further extending the trigger point away from the fulcrum locus.

Superior component b) the trigger appendage provides a substantial increase in surface area, disposing a trigger point upon a substantial curvature surface. The superior trigger appendage comprises a substantially greater sectional distance between the trigger point and the fulcrum locus, than the sectional distance between the opposing points within the loci. An object of these inventions are to provide a substantial increase in torsion between the opposing friction points. Another object of these inventions are to provide a trigger point upon a variable trigger plane. Another object of these inventions are to create more surface area to comprise the trigger point. Another object of these inventions are to create more universalness for the mechanism to various door closer sizes and designs. Another object of these inventions are to increase the distance from the trigger point to the fulcrum locus. Another object of these inventions are to project the disposable surface from the origin axis for the fixated joint. Another object of these inventions are to project the disposable surface to dissect the origin axis. Another object of these inventions are to provide an adjustment means for the trigger point upon the variable trigger plane. Another object of these inventions are to accommodate for worn or wearing opposing friction points. Another object of these inventions are to compensate for an increase in pivotal engagement. Another object of these inventions are to assist in maintaining a vertical posture for the central structure. Another object of these inventions are to assist in strengthening the fixated joint, by possibly directing the biasing force towards the joint. Another object of these inventions are to increase leverage for the trigger point. Another object of these inventions are to increase the functional gap and decrease the motion of the pivotal engagement for the mechanism.

The inventive mechanism may incorporate a second trigger plate appendage. An object of this invention is to change the direction of the friction pressure torsionally applied onto the surfaces of the rod, thus creating a reversible mechanism. Another object of this invention is to accommodate the various reciprocating operative devices.

The trigger point may be comprised upon different modified trigger appendage surface designs including a substantial arching, ovoid, or convex design, an installed pad, cap, or clip, and an adjustable screw. An object of this invention is to provide the means for further extending and varying the trigger point away from the lower-fulcrum locus. Another object of this invention is to provide a trigger point area upon a substantial curvature surface. Another object of this invention is to accommodate for worn or wearing friction pressure points. Another object of this invention is to maintain a substantial vertical posture for the central structure.

Superior component c) the fixated joint, has been changed to comprise an angle at the origin which is substantially 90 degrees or less. An object of this invention is to accommodate a superior trigger appendage design comprising a substantial curvature surface disposing a trigger point upon a variable trigger plane projecting from the origin axis. Another object of this invention is to possibly project said curvature surface above the origin axis. Another object of this invention is to provide a stronger checking mechanism that can withstand greater direct frictional pressure. Another object of this invention is to create more universalness for the checking mechanism concept, adapting the new trigger appendage design to other prior art checking mechanism concepts. Another object of this invention is to compensate for an increase in pivotal engagement due to certain checking mechanism fatigue. Another object of this invention is to eliminate slippage due to simultaneous central structure contact upon the piston body, by decreasing the pivotal engagement and increasing the functional gap.

Furthermore, material comprising the joint may be tempered, hardened, and crimped. An object of this invention is to provide superior durability for the mechanism, and more particularly, to substantially eliminate any flexation of the fixated joint.

These and further objects and advantages of the invention will be apparent from the following description of the preferred embodiments thereof.

BRIEF DESCRIPTION OF THE DRAWINGS

FIG. 10 is a reference list.

DETAILED DESCRIPTION OF THE PREFERRED EMBODIMENTS

Figure 1:
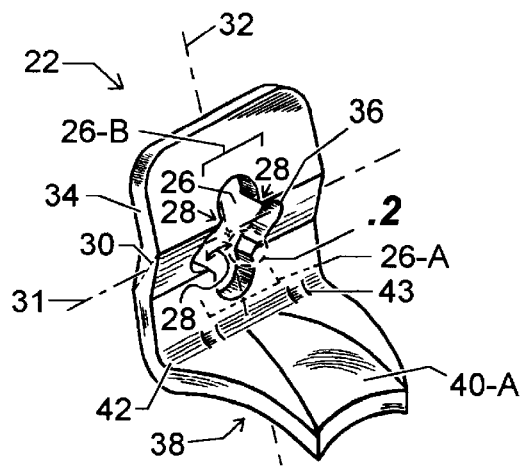
FIG. 1 is a prospective view of a superior checking mechanism or which illustrates an aperture figuration designed with notches and shown with modified opposing friction points in a point encircled for enlargement, and also showing a trigger appendage comprising a substantial curvature surface consisting of an ovoid, or convex design.

FIG. 1 through FIG. 5 are taught conceptually together wherein the checking mechanism 22 is stamp manufactured from a predetermined sheet metal gauge 37, although the mechanism 22 could be made from synthetic material with separately inserted metallic loci 26-A and 26-B. The mechanism 22 comprises a aperture configuration 26 bounded within a central structure 34 forming a fulcrum locus 26-A opposing a counter locus 26-B, composed upon a common axis of symmetry 32. The central structure 34 is attached to a trigger appendage 38 by the fixated joint 42.

Figure 2:
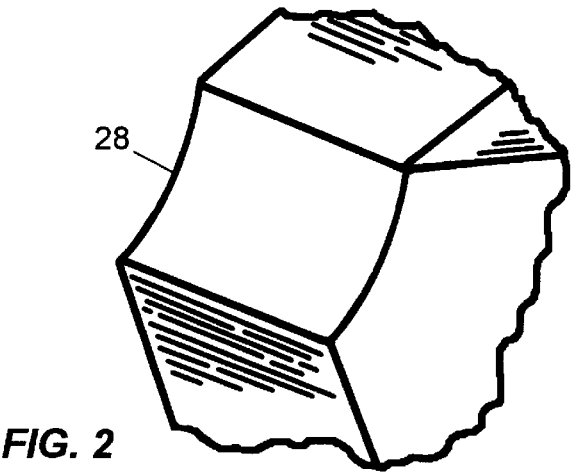
FIG. 2 is an enlarged prospective view of the encircled point of FIG. 1, illustrating the point as being modified.

FIG. 2 illustrates that the opposing friction points 28 may be further modified, as illustrated by the point 28 encircled for enlargement from FIG. 1. Modification may include plating, hardening, tipping, coating, and separate insertion into the central structure 34. Modifying the points 28 may provide durability, reduce wearing, and deliver maximum friction unto the surface of the piston rod 16. The points 28 are described as any surface area which substantially and intentionally provides direct frictional pressure 29 within the axial plane 30, urged upon the rod 16. The size, quantity, and location for the points 28 may be varied, including at least one point 28 being located upon the common axis of symmetry 32.

Figure 3:
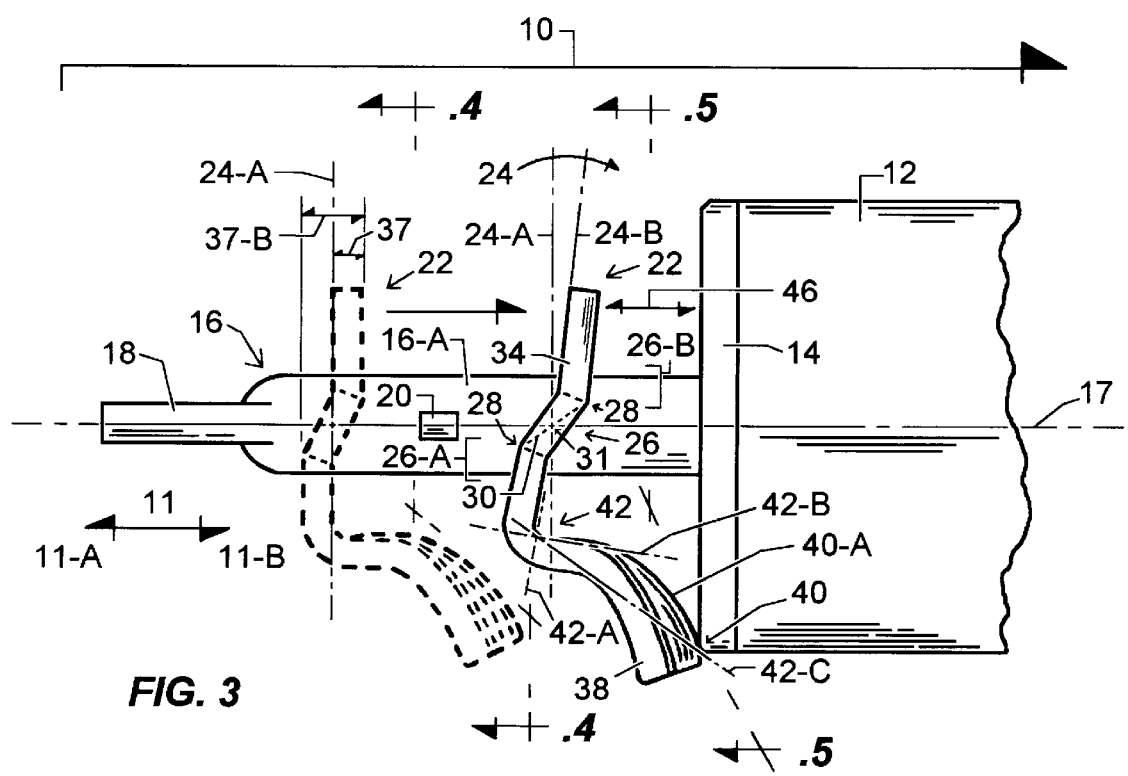
FIG. 3 is a side view of a reciprocative device comprising a door closer system, illustrating the superior checking mechanism of FIG. 1, foremost shown checking the extended piston rod. The mechanism is also shown superimposed in an idle position on the rod.

FIG. 3 illustrates the superior checking mechanism 22 shown in FIG. 1, mounted upon the reciprocative device 10. The mechanism is mounted on the rod 16 axially 17, by means of the center aperture 26 bound within the central structure 34. The superimposed mechanism 22 is shown in an idle position 24-A, residing between the support hub 18 and the protruding lug 20. The biasing means 11 extends the rod 16 away from the body 12 with outward force 11-A. For engagement, the superimposed idle mechanism 22 is moved past the protruding lugs 20 on the extended rod 16, into the position of the foremost shown mechanism 22. Inward biasing force 11B controlled by the device 10 returns the rod 16 towards the body 12. The functional gap 46 shows the distance between the mechanism 22 and the cap 14 of the body 12.

The central structure 34 provides a boundary for the aperture configuration 26. The central structure 34 provides offsetting planes 37-B greater than the thickness of the sheet metal gauge 37. Sectionally, the offsetting planes 37-B reduces the distance between the opposing friction points 28 within the loci 26-A and 26-B, relational to the center axis 31. I believe that this notion compensates for the greater pivotal engagement 24 required for the points 28 to comprise direct frictional pressure 29 distal to the common axis of symmetry 32. Thus, the checking mechanism 22 maintains a substantial vertical posture. The offsetting planes 37-B provides a shorter distance between the opposing points 28 within the loci 26-A and 26-B, possibly initiating a leverage advantage for the trigger point 40. By moving the points 28 of fulcrum locus 26-A away from the trigger point 40, a greater distance and subsequent leverage advantage is definitely provided for the trigger point 40. Therefore, greater direct frictional pressure 29 within the axial plane 30 may be created by the points 28. The offsetting planes 37-B may also permit the mechanism 22 to comprise opposing loci 26-A and 26-B defining substantially larger points 28.

The trigger appendage 38 transposes the biasing forces 11 controlled by the device 10 into the direct frictional pressure 29 upon the rod 16. The trigger appendage 38 acts as a lever and causes the foremost mechanism 22 to pivotally engage 24 into a checking position 24-B. The trigger appendage 38 comprises a substantial curvature surface including a substantial arching, ovoid, or convex design 40-A. The trigger appendage 38 disposing the trigger point 40, contacts the body 12 and end cap 14. The trigger point 40 comprises the means to substantially vary upon the surface of the trigger appendage 38. The trigger point 40 is defined upon a trigger plane 42-C. The trigger plane 42-C generally projects from the origin axis 42-B for the fixated joint 42, and projected to the trigger point 42 abutting the body 12 of the device 10. As the trigger point 40 varies upon the surface of the trigger appendage 38, the trigger plane 42-C also varies. Thus, the trigger point 40 is defined upon a superior variable trigger plane 42-C.

Figure 5:
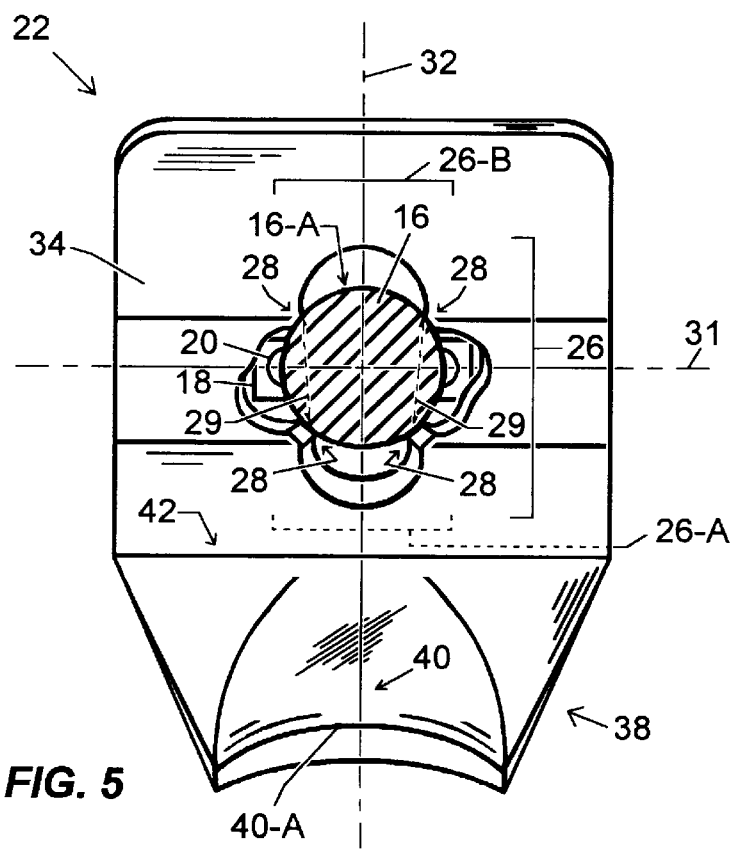
FIG. 5 is a front view of the checking mechanism foremost shown in FIG. 3, illustrating the mechanism in a checking position, the opposing friction points interacting to provide plural sources of direct frictional pressure within the axial plane, the distance between the opposing points substantially less than the cross-sectional distance of the rod.
Figure 6:
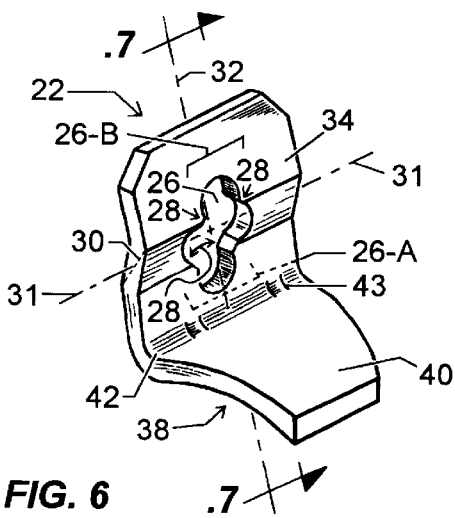
FIG. 6 is a prospective view of a checking mechanism which illustrated a trigger appendage comprising a substantial curvature surface consisting of a simple arching design.

FIG. 6 is a side view of the hold-open bracket shown in FIG. 5 which illustrates a fixated angular joint which is substantially perpendicular or less, and also illustrates the superior convexity design trigger plate appendage which includes a substantial and continual curvature surface disposing the variable trigger area upon a variable plane, projecting from, and dissecting, the axis of origin of the fixated angular joint. The curvature surface comprises a simpler design.

Because of the physics of the substantial curvature surface, more surface area becomes available to accommodate the trigger point 40. The increase in surface area substantially increases the functional gap 46. Thus, the mechanism 22 maintains a better vertical posture, and the pivotal engagement 24 is reduced. The substantial curvature surface may also be described as projecting the variable trigger point 40 to dissect the origin axis (42-B). The mechanism 22 becomes more universal and adjustable for various types of devices 10, including various diameters of piston bodies 12, end caps 14, and rods 16. The curvature surface can also compensate for fatiguing of the fixated joint 42 and wearing of the opposing friction points 28. It shall be stated that the inventive concept of the points 28 comprising direct frictional pressure 29 away from the common axis of symmetry 32, may be fully incorporated with out the need to utilize a curvature surface with the trigger appendage 38. However, the nature of the curvature surface promotes adjustability for the mechanism 22.

The variable trigger area 40 upon the variable plane 42-C can be achieved through more than a single primary bend at the fixated angular joint 42. If the reader chooses to argue that certain prior art disclosed may possibly comprises a variable trigger area 40 disposed upon a variable plane 42-C, due to any secondary angle comprising the angular fixated joint 42, such a disposable surface would certainly not comprise a substantially curvature surface, nor comprise a variable trigger area 40 disposed upon a substantially variable plane 42-C due to the substantially flattened nature of all the prior art trigger plate appendages 38 comprising a fixated joint 42.

The fixated joint 42 redirects the biasing means 11 which causes the mechanism 22 to pivot on the center axis 31 of the aperture configuration 26, and the axis 17 of rod 16. The preferred fixated joint 42 between the central structure 34 and the trigger appendage 38 comprises an angle of 90 degrees or less at the origin. The narrowness of the joint 42 creates a stronger checking mechanism 22 which substantially eliminates flexation at the joint 42, by possibly directing pressure towards the joint 42. The joint 42 also accommodates the trigger appendage 38 comprising the substantial arching, ovoid, or convex design 40-A. The joint 42 may comprise a strengthening means 43 such as tempering, hardening, and crimping.

Figure 4:
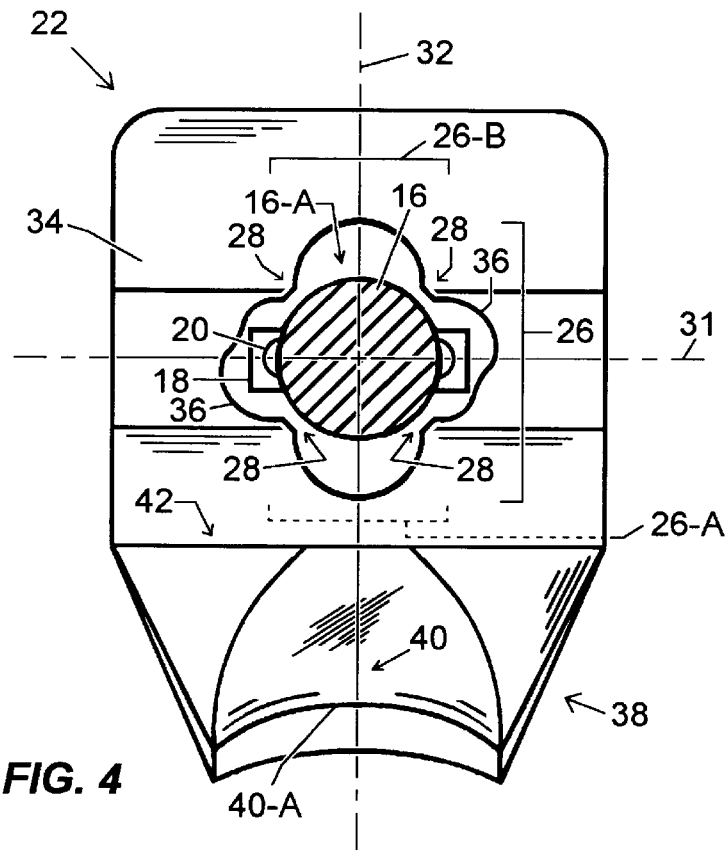
FIG. 4 is a solid front view of the checking mechanism which is superimposed in FIG. 3, conceptually illustrating the mechanism in idle position upon a sectional view of the rod comprising curved surfaces, showing the opposing friction points positioned to check away from the substantial or absolute linear alignment upon the common axis of symmetry.

FIG. 4 illustrates the aperture configuration 26 comprising the fulcrum locus 26-A opposing the counter locus 26-B, each comprising the friction points 28. The loci 26-A and 26-B are composed upon the common axis of symmetry 32 and divisional upon the center axis 31. The fulcrum locus 26-A provides two opposing friction points 28 which interacts and opposes the two opposing friction points 28 of the counter locus 26-B. The points 28 are determined by the metallic surfaces of the aperture configuration 26. The points are substantially distant from the common axis of symmetry 32. The points 28 are substantially symmetrical to the common axis of symmetry 32, and may also be substantially symmetrical to the center axis 31. The superior aperture configuration 26 includes notches 36 which accommodate the protruding lugs 20 of the piston rod 16. The sectional view of the rod 16 comprising curved surfaces 16-A shows a smaller diameter than the diameter of the aperture configuration 26.

FIG. 5 illustrates that the mechanism 22 checking the curved surfaces 16-A of the piston rod 16 with two sources of the direct frictional pressure 29 within the axial plane 30, which are separate and/or away from the absolute or the substantial linear alignment upon the common axis of symmetry 32. The sectional view of the rod 16 shows that the distance between the opposing points 28 is smaller than the diametric sectional distance of the rod 16 upon the common axis of symmetry 32. The points 28 distribute two sources of direct frictional pressure 29 within the axial plane 30 over a greater area upon the rod 16, thus promoting lateral pressure and eliminating slippage. The direct frictional pressure 29 within the axial plane 30 is not linear upon the common axis of symmetry 32.

Figure 7:
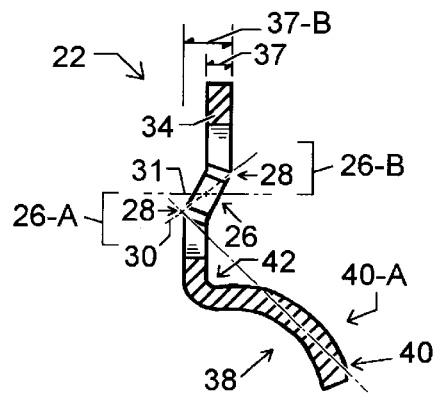
FIG. 7 is a cross-sectional view of the checking mechanism shown in FIG. 6 divided upon the common axis of symmetry, illustrating the fixated joint which is substantially 90 degrees or less, illustrating the trigger appendage comprising the simple arching design, and illustrating an angle connecting the opposing points to the trigger point.

FIG. 6 and FIG. 7 illustrate a mechanism 22 comprising an aperture configuration 26 which does not define notches 36 as in FIG. 1. These mechanisms 22 are required upon rods 16 which do not comprise protruding lugs 20. FIG. 7 specifically illustrates an angle connecting the opposing points 28 within the axial plane 30 to the variable trigger area 40. The reader is able to determine the substantial distance and consequent increase in leverage for the trigger point 40, relational to the fulcrum locus 26-A. The trigger appendage 38 provides the point 40 upon a substantial curvature surface consisting of a more simple arching design.

Figure 8:
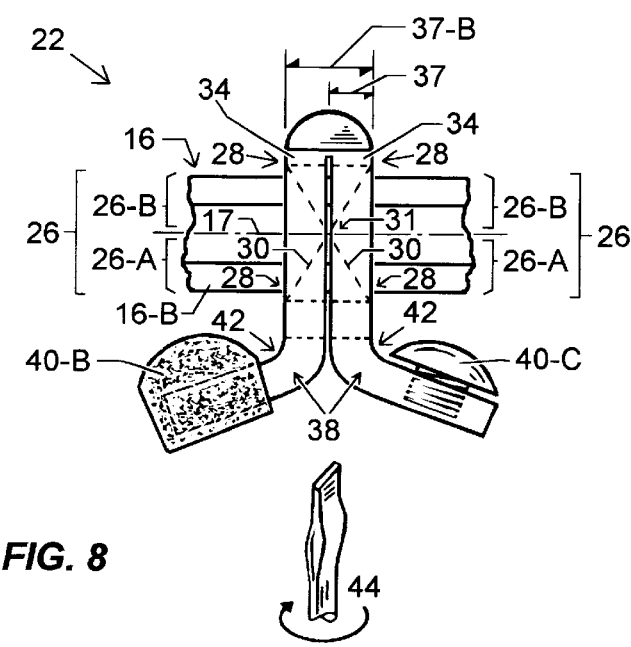
FIG. 8 is a side view of a conceptual mechanism comprising a central structure upon two separate bodies, also showing two trigger appendages with various trigger point options, and shown upon a partial piston rod comprising non-curved surfaces. A method for adjusting the mechanism is also illustrated.
Figure 9:
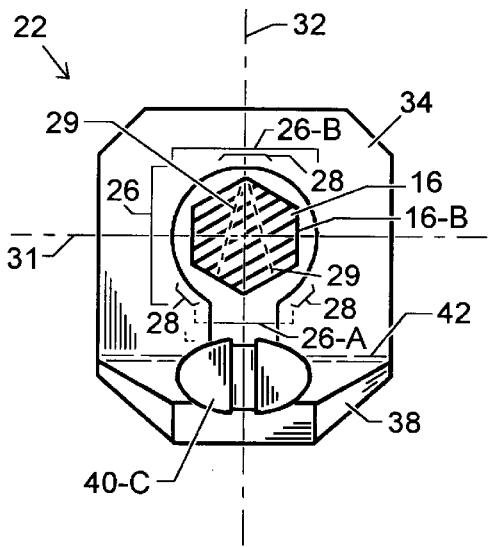
FIG. 9 is a front view of the mechanism shown in FIG. 8 which illustrates the aperture configuration comprising a minimum of three opposing frictional points, showing the trigger point upon an adjustable screw, and illustrated upon a sectional view of the piston rod comprising non-curved surfaces,.

FIG. 8 and FIG. 9 show a conceptual mechanism 22 comprising plural central structures 34 and trigger appendages 38. Among other issues, this conception is useful to provide adjustment for worn friction pressure points 28, and to accommodate for variously sized and types of reciprocative devices 10 including varied piston rod 16 and piston bodies 12. The aperture shows the three friction pressure points positioning at least one point 28 on the fulcrum locus 26-A and two points 28 at the counter locus 26-B. Note that the direct frictional pressure 29 is not linearly aligned upon the common axis of symmetry 32. The loci 26-A and 26-B comprise substantially larger points 28. Plural central structures 34, separate yet attached to each other, may provide variable opposing points 28 for the loci 26-A and 26-B within the axial plane 30. Adjustment is made perhaps with the blade of a screwdriver, by slightly prying or separating 44 the two central structures 34. Other methods of separating the loci 26-A and 26-B to comprise variability within the axial plane 30 may be utilized without departing from the invention disclosed therein.

Reversibility of the mechanism 22 may result from plural trigger appendages 38, as both the outward force 11-A and inward force 11-B may be checked. The trigger appendages 38 demonstrate a trigger point 40 both upon an adjustable screw 40-B, and a pad or clip 40-C. The mechanism 22 is conceptually illustrated upon piston rod 16 comprising non-curved surfaces 16-B. The mechanism 22 may be rotated about the rod 16 so that the points 28 coincide with the edges of the non-curved surfaces 16-B. Furthermore, the mechanism 22 can be made from an organic or synthetic material with the points 28 separately inserted. Insertion of the points 28 may require that the central structure 34 be composed of two mating parts held together with a fastening means. It shall be stated that the preferred offsetting planes 37-B are created within the plural and thicker central structures 34.

The preferred checking mechanism can be designed to universally adapt and retrofit most modem door closer systems. The improvements comprise a substantial elimination of certain slipping failure for the mechanism, thus extending the life of the complete door closer system even when the mechanism is mounted onto a smoothly polished or worn piston rod surface. The superior checking mechanism may function upon many piston rod varieties including curved and non-curved surfaces. The superior mechanism may be manufactured in an industrial metal stamping process, from sheet metal of various gauges. The sheet metal may then be substantially hardened and/or tempered to provide excellent durability of all the major components. The invention may also be incorporated into such mechanisms manufactured from synthetic materials, to include separate metallic loci inserted to serve as the frictional pressure points.

The invention can also be modified for various other types of reciprocative devices such as automotive lift support systems, which often fail to provide adequate control for hoods and hatchback doors attached thereto. Such devices require internal pressure to hold these attached objects in an open or extended position. Because the rods of such lifting devices often comprise unique or fixated supporting hubs, a superior checking mechanism could include a central structure bounding an aperture configuration which comprise two separate appendages to engage the rod, while utilizing all the particular embodiments of this invention Such checking mechanisms could be mountable upon the rod without requiring the rod or the device to be removed from the supporting hub. Although these mechanisms will not replace the functionality of the lift support system, the mechanism could enhance the performance of the device. The invention may also be incorporated in other reciprocative devices which comprise separately attached components.

The particular embodiments of the present invention which have been illustrated and discussed herein are for illustrative purposes only and are not considered as a limitation upon the scope of the appended claims. In these claims, it is my intent to claim the entire invention disclosed herein, except as I am limited by the prior art.

Accordingly, the scope of the invention should not be determined only by the embodiments illustrated, but also by the appended claims and their legal equivalents. From the above description of the invention submitted, various changes, modifications, and improvements may occur to the apparatus and methodology. All such claims are intended to be included therein.

I claim:

1. A method for frictionally checking reciprocative devices (10) including door closer systems (10) comprising a rod (16) that functions reciprocatively from within a body (12) having a biasing means (11), that, upon extension of said rod (16) from within said body (12), said device (10) normally acting to control the reciprocation of said rod (16); said checking is performed by means of a checking mechanism (22) composed of a predetermined, substantially tempered and hardened sheet metal gauge (37) for mounting axially (17) onto said rod (16), comprising an aperture configuration (26) bounded within a central structure (34) disposing a fulcrum locus (26-A) opposing a counter locus (26-B), both diametrically composed upon a common axis of symmetry (32) and each providing at least one substantial opposing friction point (28) for urging upon the surfaces (16-A) (16-B) of said rod (16) a substantial direct frictional pressure (29) created within an axial plane (30); said mechanism (22) adapted to abut against said body (12) for pivotal engagement (24) upon said device (10); wherein said common axis of symmetry (32) coincides upon a diametric cross-section of said rod (16) engaged thereto, comprising the steps of applying a force (11-A) to cause the rod (16) to be at least partially extended from within said body (12), thereby creating a reciprocative counter-force (11-B);

leveraging said mechanism (22) to pivotally engage (24) said device (10);

torquing said surfaces (16-A) (16-B) of said rod (16) between the opposing friction points (28) within modified loci (26-A) and (26-B) selected from the group consisting of tempering, hardening, plating, coating, tipping, and separate insertion into said central structure (34), to comprise a cross-sectional distance created between the points (28) which is substantially less than the cross-sectional diameter of said rod (16) upon said common axis of symmetry (32), wherein said direct frictional pressure (29) within said axial plane (30) is not in substantial linear alignment upon said common axis of symmetry (32);

urging said points (28) upon the rod surfaces (16-A) (16-B) wherein said direct frictional pressure (29) within said axial plane (30) is not in substantial linear alignment upon said common axis of symmetry (32); resisting the movement of said biasing means (11) normally acting to control the reciprocation of said rod (16), responsive to said direct frictional pressure (29) urged between the opposing friction points (28);

whereby a checking mechanism (22) frictionally checks the reciprocative function of said device (10), and any object that may be attached thereto.

2. A method for checking reciprocative devices (10) including door closer systems (10) comprising a rod (16) that functions reciprocatively from within a body (12) having a biasing means (11), that, upon extension of said rod (16) from within said body (12), said device (10) normally acting to control the reciprocation of said rod (16); said checking is performed frictionally by means of a checking mechanism (22) for mounting axially (17) onto said rod (16), comprising an aperture configuration (26) bounded within a central structure (34) disposing a fulcrum locus (26-A) opposing a counter locus (26-B), both diametrically composed upon a common axis of symmetry (32) and each providing at least one substantial opposing friction point (28) for urging upon the surfaces (16-A) (16-B) of said rod (16) a substantial direct frictional pressure (29) created within an axial plane (30); said mechanism (22) further including at least one trigger appendage (38) attached to said central structure (34) to form a fixated joint (42); said trigger appendage (38) disposing a trigger point (40) to abut against said body (12) upon a trigger plane (42-C), projected from an origin axis (42-B) originating said joint (42), and projected to the abutting trigger point (40); wherein said common axis of symmetry (32) coincides upon a diametric cross-section of said rod (16) engaged thereto, comprising the steps of applying a force (11-A) to cause the rod (16) to be at least partially extended from within said body (12), thereby creating a reciprocative counter-force (11-B);

leveraging said mechanism (22) to pivotally engage (24) said rod (16) responsive to said trigger point (40) abutting said body (12), wherein said trigger plane (42-C) comprises the means to substantially vary as the abutting trigger point (40) also varies upon the surface of said trigger appendage (38), and wherein the distance from said trigger point (40) to a friction point (28) upon said fulcrum locus (26-A) comprises a substantially greater distance than the distance between the opposing friction points (28) within the loci (26-A) and (26-B);

torquing said surfaces (16-A) (16-B) of said rod (16) between said opposing friction points (28) within the loci (26-A) and (26-B), to comprise a cross-sectional distance created between the points (28) which is substantially less than the cross-sectional diameter of said rod (16) upon said common axis of symmetry (32);

urging said points (28) upon the rod surfaces (16-A) (16-B) wherein said direct frictional pressure (29) within said axial plane (30) is not in substantial linear alignment upon said common axis of symmetry (32);

resisting the movement of said biasing means (11) normally acting to control the reciprocation of said rod (16), responsive to said direct frictional pressure (29) urged between said opposing friction points (28).

3. The method for checking reciprocative devices (10) of claim 2, wherein said step of leveraging said mechanism (22) is performed by said trigger appendage (38) comprising a substantial curvature surface selected from the group consisting of an substantial arching, ovoid, and convex design (40-A), an installed pad or clip (40-B), and an adjustable screw means (40-C), whereby said curvature surface is also projected from said origin axis (42-B) and projected to the abutting trigger point (40).

4. The method for checking reciprocative devices (10) of claim 3, wherein
said curvature surface comprising the trigger appendage (38) extend to dissect said origin axis (42-B) which projects from the fixated joint (42).

5. The method for checking reciprocative devices (10) of claim 2, wherein
said fixated joint (42) comprising an angle of substantially 90 degrees or less, projectable by projecting one axis (42-A) upon the face of said central structure (34), and projecting the other axis (42-B) from the origin of said joint (42).

6. The method for checking reciprocative devices (10) of claim 5, wherein
said fixated joint (42) further comprising a strengthening means (43) selected from the group consisting of tempering, hardening, and crimping.

7. The method for checking reciprocative devices (10) of claim 2 wherein
said step of torquing said surfaces (16-A) (16-B) of said rod (16) between the opposing friction points (28) within said loci (26-A) and (26-B) is performed by modified points (28) comprising selection from the group of tempering, hardening, plating, coating, tipping, and separate insertion into said central structure (34).

8. The method for checking reciprocative devices (10) of claim 2 wherein
said loci (26-A) and (26-B) are composed upon separate and variable bodies comprising said central structure (34), whereby varying the distance between said opposing points (28) within said axial plane (30).

9. A checking mechanism (22) composed of a predetermined, substantially tempered and hardened sheet metal gauge (37) for frictionally checking reciprocative devices (10) including door closer systems (10) comprising a rod (16) that functions reciprocatively from within a body (12) having a biasing means (11), that, upon displacement of said rod (16) from within said body (12), said device (10) normally acting to control the reciprocation of said rod (16); said checking mechanism (22) axially (17) mountable onto said rod (16) wherein a common axis of symmetry (32) coincides upon a diametric cross-section of said rod (16) engaged thereto, comprising
an aperture configuration (26) bounded within a central structure (34) disposing a fulcrum locus (26-A) opposing a counter locus (26-B), both diametrically composed upon said common axis of symmetry (32) and each providing at least one substantial opposing friction point (28) for urging upon the surfaces (16-A) (16-B) of the rod (16) a substantial direct frictional pressure (29) created within an axial plane (30), wherein the distance created between the opposing friction points (28) within the opposing loci (26-A) and (26-B) comprises a sectional distance which is smaller than the diametric cross-sectional distance of said rod (16), causing said direct frictional pressure (29) urged between said opposing frictional points (28) to not be in absolute or substantial linear alignment upon said common axis of symmetry (32);
a trigger appendage (38) for abutting against said body (12) disposing a trigger point (40) upon a variable trigger plane (42-C) projecting from an axis (42-B) originating a fixated joint (42), and projected to the abutting trigger point (40), wherein said trigger plane (42-C) comprising the means to vary substantially as said abutting trigger point (40) also varies upon the surface of said trigger appendage (38).

10. The checking mechanism (22) for frictionally checking reciprocative devices (10) of claim 9 wherein
said fixated joint (42) to form an angle comprising an axis (42-A) projected upon the face of said central structure (34), and comprises the other axis (42-B) projected from the origin said fixated joint (42), and wherein said angle comprises 90 degrees or less.

11. The checking mechanism (22) for frictionally checking reciprocative devices (10) of claim 10 wherein
said fixated joint (42) further comprising a strengthening means (43) selected from the group of tempering, hardening, and crimping.

12. The checking mechanism (22) for frictionally checking reciprocative devices (10) of claim 9 wherein
the distance between the opposing points (28) within the opposing loci (26-A) and (26-B) comprises a substantially lesser distance than the distance between the trigger point (40) to the fulcrum locus (26-A).

13. The checking mechanism (22) for frictionally checking reciprocative devices (10) of claim 9 wherein
said trigger appendage (38) comprises a substantial curvature surface disposing said trigger point (40) thereupon, selected from the group consisting of a substantial arching, ovoid, and convex design (40-A), an installed pad and clip (40-B), and an adjustable screw means (40-C), whereby said curvature surface is also projected from said origin axis (42-B) and projected to the abutting trigger point (40).

14. The checking mechanism (22) for frictionally checking reciprocative devices (10) of claim 13 wherein said curvature surface disposing the variable trigger point (40) extend to dissect said origin axis (42-B) which projects from the fixated joint (42).

15. The checking mechanism (22) for frictionally checking reciprocative devices (10) of claim 9 wherein
said opposing friction points (28) comprising a modification selected from the group of tempering, hardening, plating, coating, tipping, and separately inserting said points (28) into said central structure (34).

16. The checking mechanism (22) for frictionally checking reciprocative devices (10) of claim 9 wherein
said central structure (34) is composed of a predetermined sheet metal gauge (37), wherein said loci (26-A) and (26-B) are comprised upon offsetting planes (37-B) within a cross-sectional plane of said rod (16), the offset being greater than the thickness of said gauge (37) comprising said loci (26-A) and (26-B) thereof.

17. The checking mechanism (22) for frictionally checking reciprocative devices (10) of claim 9 wherein
said central structure (34) forming said aperture (26) so shaped to comprise that certain areas which do not define said opposing friction points (28) dispose notches (36) to expand said aperture (26), wherein said mechanism (22) may mount upon a rod (16) comprising diametrically widened supporting hub (18) or protruding lugs (20) greater than the diameter of said rod (16).

18. The checking mechanism (22) for frictionally checking reciprocative devices (10) of claim 9 further comprising said central structure (34) separated upon different bodies, wherein the distance between said opposing points (28) within said loci (26-A) and (26-B) comprise variability within said axial plane (30).

19. An improved checking mechanism (22) for checking reciprocative devices (10) including door closer systems (10) comprising a rod (16) that functions reciprocatively from within a body (12) having a biasing means (11), that, upon extension of said rod (16) from within said body (12), said device (10) normally acting to control the reciprocation of said rod (16); said checking is performed frictionally by means of a checking mechanism (22) for mounting axially (17) onto said rod (16), comprising an aperture configuration (26) bounded within a central structure (34) disposing a fulcrum locus (26-A) opposing a counter locus (26-B), both diametrically composed upon a common axis of symmetry (32) and each providing at least one substantial opposing friction point (28) for urging upon the surfaces (16-A) (16-B) of said rod (16) a substantial direct frictional pressure (29) created within an axial plane (30); said mechanism (22) further including at least one trigger appendage (38) angularly attached to said central structure (34) to form a fixated joint (42) projectable by projecting an axis (42-A) upon the face of said central structure (34), and projecting the other axis (42-B) from the origin of the fixated joint (42); said trigger appendage (38) disposing a trigger point (40) to abut against said body (12) upon a trigger plane (42-C) projected from the origin axis (42-B) and projected to the abutting trigger point (40); wherein said common axis of symmetry (32) coincides upon a diametric cross-section of said rod (16) engaged thereto, in combination the improvements comprising the opposing friction points (28) so diametrically opposed and positioned as to comprise a sectional distance which is less than the diametric cross-sectional distance of said rod (16), wherein said direct frictional pressure (29) created between the opposing points (28) within said axial plane (30) is not upon a substantial or an absolute linear alignment upon said common axis of symmetry (32), the points (28) further comprise a modification means selected from the group of tempering, hardening, plating, coating, tipping, and a separate insertion into said central structure (34);

the surface of said trigger appendage (38) disposing said trigger point (40) upon said trigger plane (42-C) variably, wherein said trigger plane (42-C) comprising the means to substantially vary as said abutting trigger point (40) varies upon the surface of said trigger appendage (38);

said fixated joint (42) composed to form an angle of substantially 90 degrees or smaller, and said fixated joint (42) further comprising a strengthening means (43) selected from the group of tempering, hardening, and crimping;

whereby said improvements comprise a superior checking mechanism (22) for frictionally checking said device (10), by providing the maximum direct frictional pressure (29) created between said opposing points (28) within said axial plane (30).

20. The improved checking mechanism (22) of claim 19 wherein said surface of said trigger appendage (38) disposing said trigger point (40) comprises a substantial curvature surface selected from the group consisting of a substantial arching, ovoid, and convex design (40-A), an installed pad and clip (40-B), and an adjustable screw means (40-C) whereby said curvature surface is also projected from said origin axis (42-B) and projected to the abutting trigger point (40).

21. The improved checking mechanism (22) of claim 19 wherein the distance between said trigger point (40) to the fulcrum locus (26-A) comprise a substantially greater distance than the distance between the opposing points (28) within the opposing loci (26-A) and (26-B).

22. The improved checking mechanism (22) of claim 19 wherein said loci (26-A) and (26-B) are comprised upon offsetting planes (37-B) along a sectional plane of said rod (16), wherein the offset comprises a substantially greater distance than the thickness of a predetermined sheet metal gauge (37) comprising said loci (26-A) and (26-B) thereof.

23. The improved checking mechanism (22) of claim 19 wherein said central structure (34) forming said aperture (26) so shaped to comprise that certain areas which do not define said opposing friction points (28) dispose notches (36) to expand said aperture (26), wherein said mechanism (22) may mount upon a rod (16) comprising diametrically widened supporting hub (18) or protruding lugs (20) greater than the sectional diameter of said rod (16).

24. The improved checking mechanism (22) of claim 19 wherein said central structure (34) separated upon different bodies, wherein the distance between said opposing points (28) within said loci (26-A) and (26-B) comprises the means for variability within said axial plane (30).

25. The improved checking mechanism (22) of claim 19 wherein composition for said mechanism (22) selected from the group of natural and synthetic metals, fibers, ceramics, and plastics.

* * * * *